US009406177B2

(12) United States Patent
Attard et al.

(10) Patent No.: US 9,406,177 B2
(45) Date of Patent: Aug. 2, 2016

(54) FAULT HANDLING IN AN AUTONOMOUS VEHICLE

(71) Applicant: Ford Global Technologies, LLC, Dearborn, MI (US)

(72) Inventors: Christopher Attard, Ann Arbor, MI (US); Shane Elwart, Ypsilanti, MI (US); Jeff Allen Greenberg, Ann Arbor, MI (US); Rajit Johri, Ann Arbor, MI (US); John P. Joyce, West Bloomfield, MI (US); Devinder Singh Kochhar, Ann Arbor, MI (US); Douglas Scott Rhode, Farmington Hills, MI (US); John Shutko, Ann Arbor, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 14/184,860

(22) Filed: Feb. 20, 2014

(65) Prior Publication Data

US 2015/0178998 A1 Jun. 25, 2015

Related U.S. Application Data

(63) Continuation-in-part of application No. 14/136,495, filed on Dec. 20, 2013, now Pat. No. 9,346,400.

(51) Int. Cl.

| | |
|---|---|
| ***G01C 22/00*** | (2006.01) |
| ***G05D 1/00*** | (2006.01) |
| ***G07C 5/00*** | (2006.01) |
| ***G07C 5/08*** | (2006.01) |

(52) U.S. Cl.

CPC .............. *G07C 5/008* (2013.01); *G07C 5/0808* (2013.01)

(58) Field of Classification Search

CPC ........ G05B 13/026; G05B 13/02; G08G 1/16; G05D 1/0257; G05D 2201/0213; G05D 1/0261; G05D 1/0289; G05D 1/02

USPC ........................................... 701/2, 23, 24, 25

See application file for complete search history.

(56) References Cited

U.S. PATENT DOCUMENTS

| | | | | |
|---|---|---|---|---|
| 5,331,561 | A * | 7/1994 | Barrett et al. | 701/23 |
| 5,572,449 | A * | 11/1996 | Tang et al. | 700/304 |
| 5,887,268 | A * | 3/1999 | Furukawa | 701/23 |
| 6,128,559 | A * | 10/2000 | Saitou | B61L 23/34 340/436 |
| 6,236,915 | B1 * | 5/2001 | Furukawa et al. | 701/25 |
| 6,313,758 | B1 * | 11/2001 | Kobayashi | G08G 1/162 340/436 |

(Continued)

FOREIGN PATENT DOCUMENTS

| | | | |
|---|---|---|---|
| CN | 102867393 | A | 1/2013 |
| DE | 102008052322 | A1 | 4/2010 |
| EP | 1862985 | A3 | 6/2008 |

OTHER PUBLICATIONS

Non-Final Office Action dated Sep. 21, 2015; U.S. Appl. No. 14/136,495.

*Primary Examiner* — Jaime Figueroa

(74) *Attorney, Agent, or Firm* — Frank MacKenzie; Bejin Bieneman PLC

(57) ABSTRACT

Data is collected during operation of a vehicle. A determination is made that a confidence assessment of at least one of the data indicates at least one fault condition. A first autonomous operation affected by the fault condition is discontinued, where a second autonomous operation that is unaffected by the fault condition is continued.

20 Claims, 3 Drawing Sheets

(56) References Cited

U.S. PATENT DOCUMENTS

| | | | | |
|---|---|---|---|---|
| 6,553,288 | B2 * | 4/2003 | Taguchi ................. G08G 1/164 180/167 | |
| 6,882,923 | B2 * | 4/2005 | Miller et al. .................... 701/96 | |
| 6,985,089 | B2 * | 1/2006 | Liu ........................ G08G 1/161 340/436 | |
| 7,499,776 | B2 | 3/2009 | Allard et al. | |
| 7,664,589 | B2 * | 2/2010 | Etori et al. ...................... 701/96 | |
| 7,689,230 | B2 * | 3/2010 | Spadafora et al. ......... 455/456.1 | |
| 7,831,345 | B2 * | 11/2010 | Heino ...................... B62D 1/28 299/1.9 | |
| 8,116,921 | B2 * | 2/2012 | Ferrin et al. ...................... 701/1 | |
| 8,135,507 | B2 | 3/2012 | Okabe et al. | |
| 8,504,233 | B1 * | 8/2013 | Ferguson et al. ............... 701/23 | |
| 8,510,029 | B2 * | 8/2013 | Curtis et al. .................. 701/301 | |
| 8,718,861 | B1 * | 5/2014 | Montemerlo ......... B60W 30/00 701/26 | |
| 9,076,341 | B2 * | 7/2015 | Funabashi ................ G08G 1/22 | |
| 2005/0134440 | A1 * | 6/2005 | Breed ........................... 340/435 | |
| 2008/0055068 | A1 * | 3/2008 | Van Wageningen et al. .......................... 340/539.3 | |
| 2008/0140278 | A1 * | 6/2008 | Breed ............................. 701/29 | |
| 2009/0076673 | A1 | 3/2009 | Brabec | |
| 2010/0256852 | A1 * | 10/2010 | Mudalige ......................... 701/24 | |
| 2012/0126997 | A1 * | 5/2012 | Bensoussan .................. 340/905 | |
| 2012/0314070 | A1 * | 12/2012 | Zhang et al. .................. 348/148 | |
| 2012/0323474 | A1 * | 12/2012 | Breed et al. ................... 701/117 | |
| 2013/0024084 | A1 * | 1/2013 | Yamashiro .......... B60W 50/029 701/96 | |
| 2013/0030606 | A1 * | 1/2013 | Mudalige et al. ................. 701/2 | |
| 2013/0154853 | A1 * | 6/2013 | Chen ................ G08G 1/096716 340/905 | |
| 2013/0279491 | A1 * | 10/2013 | Rubin et al. .................. 370/347 | |
| 2013/0297195 | A1 * | 11/2013 | Das et al. ...................... 701/117 | |
| 2013/0325241 | A1 * | 12/2013 | Lombrozo et al. .............. 701/23 | |
| 2014/0186052 | A1 * | 7/2014 | Oshima et al. ................ 398/130 | |
| 2014/0302774 | A1 * | 10/2014 | Burke .................... H04H 20/57 455/3.05 | |
| 2014/0303827 | A1 | 10/2014 | Dolgov et al. | |

* cited by examiner

FAULT HANDLING IN AN AUTONOMOUS VEHICLE

RELATED APPLICATION

This application is a continuation-in-part of, and as such, claims priority to, U.S. application Ser. No. 14/136,495, entitled "AFFECTIVE USER INTERFACE IN AN AUTONOMOUS VEHICLE," filed Dec. 20, 2013, the contents of which are hereby incorporated herein by reference in their entirety.

BACKGROUND

A vehicle, e.g., a car, truck, bus, etc., may be operated wholly or partly without human intervention, i.e., may be semi-autonomous or autonomous. For example, the vehicle may include sensors and the like that convey information to a central computer in the vehicle. The central computer may use received information to operate the vehicle, e.g., to make decisions concerning vehicle speed, course, etc. However, mechanisms are needed for evaluating a computer's ability to autonomously operate the vehicle, and for determining an action or actions to take when one or more faults are detected.

DRAWINGS

DESCRIPTION

Introduction

Figure 1:
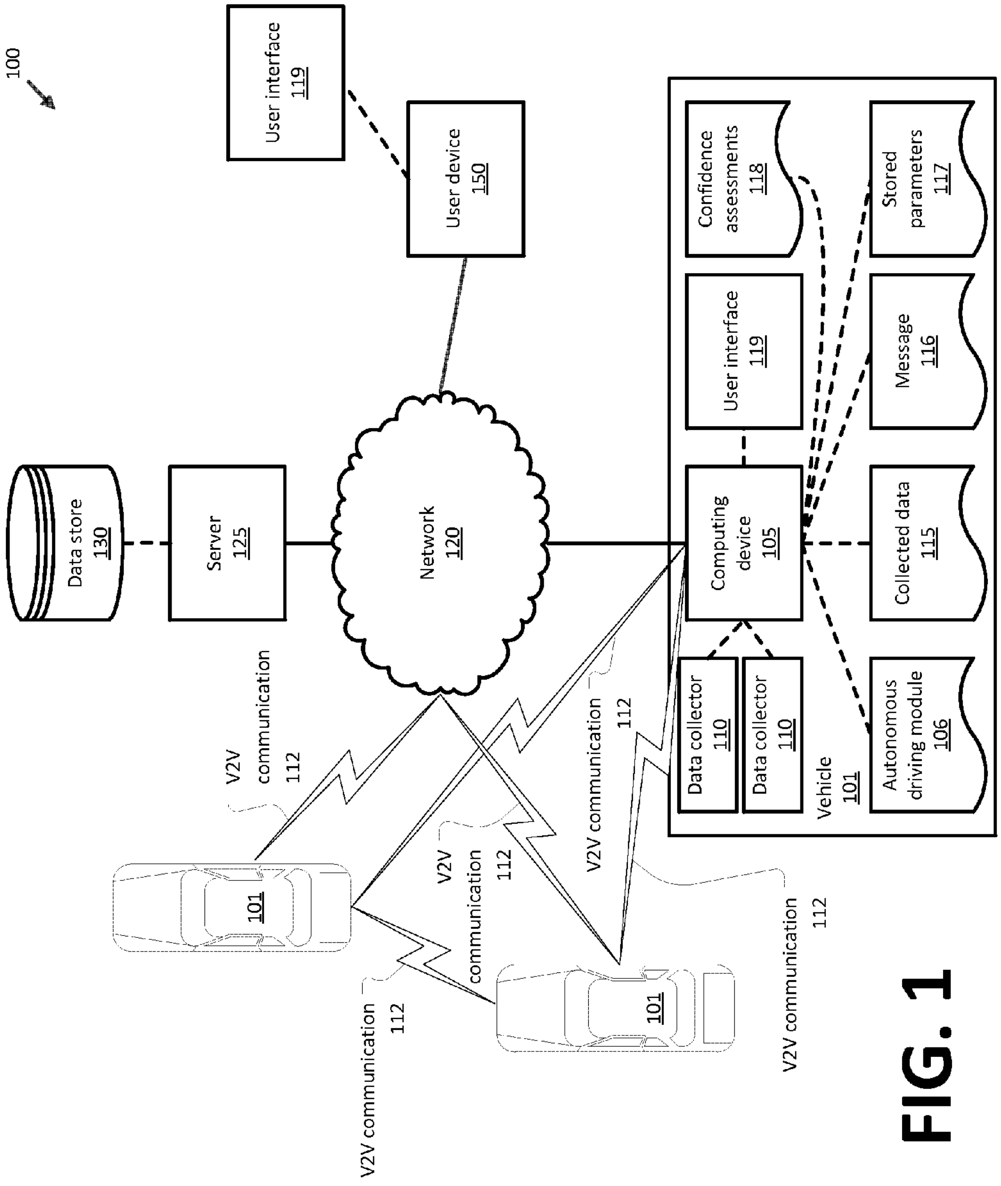
FIG. 1 is a block diagram of an exemplary vehicle system for autonomous vehicle operation, including mechanisms for detecting and handling faults.

FIG. 1 is a block diagram of an exemplary vehicle system 100 for operation of an autonomous vehicle 101, i.e., a vehicle 101 completely or partly operated according to control directives determined in a vehicle 101 computer 105. The computer 105 may include instructions for determining that an autonomous driving module 106, e.g., included in the vehicle computer 105, may not be able to operate the vehicle 101 autonomously or semi-autonomously with acceptable confidence, e.g., confidence expressed numerically that is lower than a predetermined threshold. For example a fault or faults could be detected with respect to one or more data collectors 110, e.g., sensors or the like, in a first vehicle 101. Further, once a fault is detected, the first vehicle 101 may send a vehicle-to-vehicle communication 112 to one or more second vehicles 101 and/or may send data via a network 120 to a remote server 125. Moreover, further operation of the first vehicle 101 may use data 115 from collectors 110 in the first vehicle 101 to the extent such data 115 is not subject to a fault, and may further use data 115 from one or more second vehicles 101 that may be received in a vehicle-to-vehicle communication 112.

Alternatively or additionally, when a fault is detected in a vehicle 101, the vehicle 101 could cease and/or disable one or more particular autonomous operations dependent on a data collector 110 in which the fault was detected. For example, the vehicle 101 computer 105 could depend on radar or lidar data 115 to detect and/or to maintain a distance from other vehicles 101. Accordingly, if radar and/or lidar data collectors 110 needed for such distance detection and/or maintenance were associated with a fault condition, the vehicle 101 could cease and/or disable an adaptive cruise control or like mechanism for detecting and maintaining a distance from other vehicles 101. However, if other data collectors 110 were available for other autonomous operations, e.g., detecting and maintaining a lane, clearing vehicle 101 windows, etc., the vehicle 101 could continue to conduct such operations.

Reasons for lower confidence could include degradation of data collection devices 110 such as sensors, e.g., caused by weather conditions, blockage or other noise factors. Lower confidence in autonomous operations could also occur if design parameters of the autonomous vehicle 101 operation are exceeded. For example, confidence assessments 118 may arise from data 115 provided by data collectors 110 included in a perceptual layer (PL) of the autonomous vehicle 101, or from data collectors 110 in an actuation layer (AL). For the PL, these confidence estimates, or probabilities, may be interpreted as a likelihood that perceptual information is sufficient for normal, safe operation of the vehicle 101. For the AL, the probabilities, i.e., confidence estimates, express a likelihood that a vehicle 101 actuation system can execute commanded vehicle 101 operations within one or more design tolerances. Accordingly, the system 100 provides mechanisms for detecting and addressing lower than acceptable confidence(s) in one or more aspects of vehicle 101 operations.

Autonomous operations of the vehicle 101, including generation and evaluation of confidence assessments 118, may be performed in an autonomous driving module 106, e.g., as a set of instructions stored in a memory of, and executable by a processor of, a computing device 105 in the vehicle 101. The computing device 105 generally receives collected data 115 from one or more data collectors, e.g., sensors, 110. The collected data 115, as explained above, may be used to generate one or more confidence assessments 118 relating to autonomous operation of the vehicle 101. By comparing the one or more confidence assessments to one or more stored parameters 117, the computer 105 can determine whether to provide an alert or the like to a vehicle 101 occupant, e.g., via an interface 119. Further additionally or alternatively, based on the one or more confidence assessments 118, message 116, e.g., an alert, can convey a level of urgency or importance to a vehicle 101 operator, e.g., by using prosody techniques to include emotional content in a voice alert, a visual avatar having an appearance tailored to a level of urgency, etc. Yet further additionally or alternatively based on the one or more confidence assessments 118, i.e., an indication of a detected fault or faults, the computer 105 can determine an action to take regarding autonomous operation of the vehicle 101, e.g., to disable one or more autonomous functions or operations, to limit or cease operation of the vehicle 101, e.g., implement a "slow to a stop" or "pull over and stop" operation, implement a "limp home" operation, etc.

Concerning messages 116, one example from many possible, an example, an alert may inform the vehicle 101 occupant of a need to resume partial or complete manual control of the vehicle 101. Further, as mentioned above, a form of a message 116 may be tailored to its urgency. For example, an audio alert can be generated with prosody techniques used to convey a level of urgency associated with the alert. Alternatively or additionally, a graphical user interface included in a human machine interface of the computer 105 may be configured to display particular colors, fonts, font sizes, an avatar or the like representing a human being, etc., to indicate a level of urgency, e.g., immediate manual control is recommended, manual control may be recommended within the next minute, within the next five minutes, manual control is recommended for mechanical reasons, manual control is recommended for environmental or weather conditions, manual control is recommended because of traffic conditions, etc.

Relating to an action or actions in response to one or more detected faults, examples include a first vehicle 101 receiving a communication 112 from one or more second vehicles 101 for operation, e.g., navigation, of the first vehicle 101. Examples relating to action or actions in response to one or more detected faults alternatively or additionally include the first vehicle 101 disabling and/or ceasing one or more autonomous operations, e.g., steering control, speed control, adaptive cruise control, lane maintenance, etc.

Exemplary System Elements

A vehicle 101 may be a land vehicle such as a motorcycle, car, truck, bus, etc., but could also be a watercraft, aircraft, etc. In any case, the vehicle 101 generally includes a vehicle computer 105 that includes a processor and a memory, the memory including one or more forms of computer-readable media, and storing instructions executable by the processor for performing various operations, including as disclosed herein. For example, the computer 105 generally includes, and is capable of executing, instructions such as may be included in the autonomous driving module 106 to autonomously or semi-autonomously operate the vehicle 101, i.e., to operate the vehicle 101 without operator control, or with only partial operator control.

Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may be configured for communicating with the network 120, which, as described below, may include various wired and/or wireless networking technologies, e.g., cellular, Bluetooth, wired and/or wireless packet networks, etc. Further, the computer 105, e.g., in the module 106, generally includes instructions for receiving data, e.g., collected data 115 from one or more data collectors 110 and/or data from an affective user interface 119 that generally includes a human machine interface (HMI), such as an interactive voice response (IVR) system, a graphical user interface (GUI) including a touchscreen or the like, etc.

As mentioned above, generally included in instructions stored in and executed by the computer 105 is an autonomous driving module 106 or, in the case of a non-land-based or road vehicle, the module 106 may more generically be referred to as an autonomous operations module 106. Using data received in the computer 105, e.g., from data collectors 110, data included as stored parameters 117, confidence assessments 118, etc., the module 106 may control various vehicle 101 components and/or operations without a driver to operate the vehicle 101. For example, the module 106 may be used to regulate vehicle 101 speed, acceleration, deceleration, steering, braking, etc.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like for detecting conditions outside the vehicle 101, e.g., medium-range and long-range sensors. For example, sensor data collectors 110 could include mechanisms such as RADAR, LIDAR, sonar, cameras or other image capture devices, that could be deployed to measure a distance between the vehicle 101 and other vehicles or objects, to detect other vehicles or objects, and/or to detect road attributes, such as curves, potholes, dips, bumps, changes in grade, lane boundaries, etc.

A data collector 110 may further include biometric sensors 110 and/or other devices that may be used for identifying an operator of a vehicle 101. For example, a data collector 110 may be a fingerprint sensor, a retina scanner, or other sensor 110 providing biometric data 105 that may be used to identify a vehicle 101 operator and/or characteristics of a vehicle 101 operator, e.g., gender, age, health conditions, etc. Alternatively or additionally, a data collector 110 may include a portable hardware device, e.g., including a processor and a memory storing firmware executable by the processor, for identifying a vehicle 101 operator. For example, such portable hardware device could include an ability to wirelessly communicate, e.g., using Bluetooth or the like, with the computer 105 to identify a vehicle 101 operator.

A memory of the computer 105 generally stores collected data 115. Collected data 115 may include a variety of data collected in a vehicle 101 from data collectors 110. Examples of collected data 115 are provided above, and moreover, data 115 may additionally include data calculated therefrom in the computer 105. In general, collected data 115 may include any data that may be gathered by a collection device 110 and/or derived from such data. Accordingly, collected data 115 could include a variety of data related to vehicle 101 operations and/or performance, as well as data related to motion, navigation, etc. of the vehicle 101. For example, collected data 115 could include data 115 concerning a vehicle 101 speed, acceleration, braking, detection of road attributes such as those mentioned above, weather conditions, etc.

As mentioned above, a vehicle 101 may send and receive one or more vehicle-to-vehicle (v2v) communications 112. Various technologies, including hardware, communication protocols, etc., may be used for vehicle-to-vehicle communications. For example, v2v communications 112 as described herein are generally packet communications and could be sent and received at least partly according to Dedicated Short Range Communications (DSRC) or the like. As is known, DSRC are relatively low-power operating over a short to medium range in a spectrum specially allocated by the United States government in the 5.9 GHz band.

A v2v communication 112 may include a variety of data concerning operations of a vehicle 101. For example, a current specification for DSRC, promulgated by the Society of Automotive Engineers, provides for including a wide variety of vehicle 101 data in a v2v communication 112, including vehicle 101 position (e.g., latitude and longitude), speed, heading, acceleration status, brake system status, transmission status, steering wheel position, etc.

Further, v2v communications 112 are not limited to data elements included in the DSRC standard, or any other standard. For example, a v2v communication 112 can include a wide variety of collected data 115 obtained from a vehicle 101 data collectors 110, such as camera images, radar or lidar data, data from infrared sensors, etc. Accordingly, a first vehicle 101 could receive collected data 115 from a second vehicle 101, whereby the first vehicle 101 computer 105 could use the collected data 115 from the second vehicle 101 as input to the autonomous module 106 in the first vehicle 101, i.e., to determine autonomous or semi-autonomous operations of the first vehicle 101, such as how to execute a "limp home" operation or the like and/or how to continue operations even though there is an indicated fault or faults in one or more data collectors 110 in the first vehicle 101.

A v2v communication 112 could include mechanisms other than RF communications, e.g., a first vehicle 101 could provide visual indications to a second vehicle 101 to make a v2v communication 112. For example, the first vehicle 101 could move or flash lights in a predetermined pattern to be detected by camera data collectors or the like in a second vehicle 101.

A memory of the computer 105 may further store one or more parameters 117 for comparison to confidence assessments 118. Accordingly, a parameter 117 may define a set of confidence intervals; when a confidence assessment 118 indicates that a confidence value falls within a confidence interval at or passed a predetermined threshold, such threshold also specified by a parameter 117, then the computer 105 may include instructions for providing an alert or the like to a vehicle 101 operator.

In general, a parameter 117 may be stored in association with an identifier for a particular user or operator of the vehicle 101, and/or a parameter 117 may be generic for all operators of the vehicle 101. Appropriate parameters 117 to be associated with a particular vehicle 101 operator, e.g., according to an identifier for the operator, may be determined in a variety of ways, e.g., according to operator age, level of driving experience, etc. As mentioned above, the computer 101 may use mechanisms, such as a signal from a hardware device identifying a vehicle 101 operator, user input to the computer 105 and/or via a device 150, biometric collected data 115, etc., to identify a particular vehicle 101 operator whose parameters 117 should be used.

Various mathematical, statistical and/or predictive modeling techniques could be used to generate and/or adjust parameters 117. For example, a vehicle 101 could be operated autonomously while monitored by an operator. The operator could provide input to the computer 105 concerning when autonomous operations appeared safe, and when unsafe. Various known techniques could then be used to determine functions based on collected data 115 to generate parameters 117 and assessments 118 to which parameters 118 could be compared.

Confidence assessments 118 are numbers that may be generated according to instructions stored in a memory of the computer 105 in a vehicle 101 using collected data 115 from the vehicle 101. Confidence assessments 118 are generally provided in two forms. First, an overall confidence assessment 118, herein denoted as $\Phi$, may be a continuously or nearly continuously varying value that indicates an overall confidence that the vehicle 101 can and/or should be operated autonomously. That is, the overall confidence assessment 118 may be continuously or nearly continuously compared to a parameter 117 to determine whether the overall confidence meets or exceed a threshold provided by the parameter 117. Accordingly, the overall confidence assessment 118 may serve as an indicia of whether, based on current collected data 115, a vehicle 101 should be operated autonomously, may be provided as a scalar value, e.g., as a number having a value in the range of 0 to 1.

Second, one or more vector of autonomous attribute assessments 118 may be provided, where each value in the vector relates to an attribute and/or of the vehicle 101 and/or a surrounding environment related to autonomous operation of the vehicle 101, e.g., attributes such as vehicle speed, braking performance, acceleration, steering, navigation (e.g., whether a map provided for a vehicle 101 route deviates from an actual arrangement of roads, whether unexpected construction is encountered, whether unexpected traffic is encountered, etc.), weather conditions, road conditions, etc.

In general, various ways of estimating confidences and/or assigning values to confidence intervals are known and may be used to generate the confidence assessments 118. For example, various vehicle 101 data collectors 110 and/or subsystems may provide collected data 115, e.g., relating to vehicle speed, acceleration, braking, etc. For example, a data collector 110 evaluation of likely accuracy, e.g., sensor accuracy, could be determined from collected data 115 using known techniques. Further, collected data 115 may include information about an external environment in which the vehicle 101 is traveling, e.g., road attributes such as those mentioned above, data 115 indicating a degree of accuracy of map data being used for vehicle 101 navigation, data 115 relating to unexpected road construction, traffic conditions, etc. By assessing such collected data 115, and possibly weighting various determinations, e.g., a determination of a sensor data collector 110 accuracy and one or more determinations relating to external and/or environmental conditions, e.g., presence or absence of precipitation, road conditions, etc., one or more confidence assessments 118 may be generated providing one or more indicia of the ability of the vehicle 101 to operate autonomously.

An example of a vector of confidence estimates 118 include a vector $\phi^{PL}=(\phi_1^{PL}, \phi_2^{PL}, \ldots, \phi_n^{PL})$, relating to the vehicle 101 perceptual layer (PL), where n is a number of perceptual sub-systems, e.g., groups of one or more sensor data collectors 110, in the PL. Another example of a vector of confidence estimates 118 includes a vector $\phi^{AL}=(\phi_1^{AL}, \phi_2^{AL}, \ldots, \phi_m^{AL})$, relating to the vehicle 101 actuation layer (AL), e.g., groups of one or more actuator data collectors 110, in the AL.

In general, the vector $\phi^{PL}$ may be generated using one or more known techniques, including, without limitation, Input Reconstruction Reliability Estimate (IRRE) for a neural network, reconstruction error of displacement vectors in an optical flow field, global contrast estimates from an imaging system, return signal to noise ratio estimates in a radar system, internal consistency checks, etc. For example, a Neural Network road classifier may provide conflicting activation levels for various road classifications (e.g., single lane, two lane, divided highway, intersection, etc.). These conflicting activations levels will result in PL data collectors 110 reporting a decreased confidence estimate from a road classifier module in the PL. In another example, radar return signals may be attenuated due to atmospheric moisture such that radar module reports low confidence in estimating the range, range-rate or azimuth of neighboring vehicles.

Confidence estimates may also be modified by the PL based on knowledge obtained about future events. For example, the PL may be in real-time communication with a data service, e.g., via the server 125, that can report weather along a planned or projected vehicle 101 route. Information about a likelihood of weather that might adversely affect the PL (e.g., heavy rain or snow) can be factored into the confidence assessments 118 in the vector $\phi^{PL}$ in advance of actual degradation of sensor data collector 110 signals. In this way the confidence assessments 118 may be adjusted to reflect not only the immediate sensor state but also a likelihood that the sensor state may degrade in the near future.

Further, in general the vector $\phi^{AL}$ may be generated by generally known techniques that include comparing a commanded actuation to resulting vehicle 101 performance. For example, a measured change in lateral acceleration for a given commanded steering input (steering gain) could be compared to an internal model. If the measured value of the steering gain varies more than a threshold amount from the model value, then a lower confidence will be reported for that subsystem. Note that lower confidence assessments 118 may or may not reflect a hardware fault; for example, environmental conditions (e.g., wet or icy roads) may lower a related confidence assessment 118 even though no hardware failure is implied.

When an overall confidence assessment 118 for a specified value or range of values, e.g., a confidence interval, meets or exceeds a predetermined threshold within a predetermined margin of error, e.g., 95 percent plus or minus three percent, then the computer 105 may include instructions for providing a message 116, e.g., an alert, via the affective interface 119. That is, the affective interface 119 may be triggered when the overall confidence assessment 118 ($\Phi$) drops below a specified predetermined threshold $\Phi_{min}$. When this occurs, the affective interface 119 formulates a message 116 (M) to be delivered to a vehicle 101 operator. The message 116 M generally includes two components, a semantic content component S and an urgency modifier U. Accordingly, the interface 119 may include a speech generation module, and interactive voice response (IVR) system, or the like, such as are known for generating audio speech. Likewise, the interface 119 may include a graphical user interface (GUI) or the like that may display alerts, messages, etc., in a manner to convey a degree of urgency, e.g., according to a font size, color, use of icons or symbols, expressions, size, etc., of an avatar or the like, etc.

Further, confidence attribute sub-assessments 118, e.g., one or more values in a vector $\phi^{PL}$ or $\phi^{AL}$, may relate to particular collected data 115, and may be used to provide specific content for one or more messages 116 via the interface 119 related to particular attributes and/or conditions related to the vehicle 101, e.g., a warning for a vehicle 101 occupant to take over steering, to institute manual braking, to take complete control of the vehicle 101, etc. That is, an overall confidence assessment 118 may be used to determine that an alert or the like should be provided via the affective interface 119 in a message 116, and it is also possible that, in addition, specific content of the message 116 alert may be based on attribute assessments 118. For example, message 116 could be based at least in part on one or more attribute assessments 118 and could be provided indicating that autonomous operation of a vehicle 101 should cease, and alternatively or additionally, the message 116 could indicate as content a warning such as "caution: slick roads," or "caution: unexpected lane closure ahead." Moreover, as mentioned above and explained further below, emotional prosody may be used in the message 116 to indicate a level of urgency, concern, or alarm related to one or more confidence assessments 118.

In general, a message 116 may be provided by the computer 105 when $\Phi<\Phi_{min}$ (note that appropriate hysteresis may be accounted for in this evaluation to prevent rapid switching). Further, when it is determined that $\Phi<\Phi_{min}$, components of each of the vectors $\phi^{PL}$ and $\phi^{AL}$ may be evaluated to determine whether a value of the vector component falls below a predetermined threshold for the vector component. For each vector component that falls below the threshold, the computer 105 may formulate a message 116 to be provided to a vehicle 101 operator. Further, an item semantic content $S_i$ of the message 116 may be determined according to an identity of the component that has dropped below threshold, i.e.:

$$S_i=S(\phi_i)\forall\phi_i<\phi_{min}$$

For example, if $\phi_1$ is a component representing optical lane-tracking confidence and $\phi_1<\phi_{min}$ then $S_i$ might become: "Caution: the lane-tracking system is unable to see the lane-markings. Driver intervention is recommended."

The foregoing represents a specific example of a general construct based on a grammar by which a message 116 may be formulated. The complete grammar of such a construct may vary; important elements of a message 116 grammar may include:

- A signal word (SW) that begins a message 116; in the example above, SW=f(i, $\phi_i$) is the word "Caution." Depending on a particular vehicle 101 subsystem (i) and the confidence value $\phi_i$, the SW could be one of {"Deadly", "Danger", "Warning", "Caution", "Notice"} or some other word;
- A sub-system description (SSD) that identifies a vehicle 101 sub-system; in the example above, SSD=f(i) is the phrase "the lane-tracking system" which describes the $i^{th}$ system in user-comprehensible language;
- A quality of function indicator (QoF) that describes how the sub-system operation has degraded; in the example above, QoF=f(i, $\phi_i$) is the phrase "is unable";
- A function descriptor (FD) that conveys what function will be disrupted; in the example above, FD=f(i) is the phrase "to see the lane markings";
- A requested action (RA); in the example above, RA=f(i, $\phi_i$) is the phrase "Driver intervention";
- The recommendation strength (RS); in the example above, RS=f(i, $\phi_i$) is the phrase "is recommended."

In general, a language appropriate grammar may be defined to determine the appropriate arrangement of the various terms to ensure that a syntactically correct phrase in the target language is constructed. Continuing the above example, a template for a warning message 116 could be:

<SW>: <SSD><QoF><FD><RA><RS>

Once semantic content $S_i$ has been formulated, the computer 105 modifies text-to-speech parameters based on the value of the overall confidence assessment 118 ($\Phi$) is below a predetermined threshold, e.g., to add urgency to draw driver attention. In general, a set of modified parameters U={gender, sw repitition count, word unit duration, word, . . . } may be applied to $S_i$ to alter or influence a vehicle 101 operator's perception of the message 116. Note that "sw repetition count" is applied only to the signal word component (e.g., "Danger-Danger" as opposed to "Danger"). For the continuous components of U the perceived urgency is assumed to follow a Stevens power law such as urgency=$k(U_i)^m$. The individual $U_i$ are a function of the overall confidence estimate $\Phi$. Applied to the lane-tracking warning above these modifications might alter the presentation of the warning in the following ways.

- The gender (male, female) of the text-to-speech utterance could be male for higher values of $\Phi$ and female for lower values, since female voices have been found to generate more cautious responses. This could be reversed in some cultures depending on empirical findings.

SW repetition count would be higher for lower values of Φ because increased repetitions of the signal word are associated with increased perceived urgency.

Word unit duration would be shorter for lower values of Φ based on an increased perception of urgency with shorter word durations.

Pitch would increase for lower values of Φ.

Other parameters (e.g., the number of irregular harmonics) that change the acoustical rendering of speech could also be altered.

Continuing with the description of elements shown in FIG. 1, network 120 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 117. For example, one or more parameters 117 for a particular user could be stored in the server 125 and retrieved by the computer 105 when the user was in a particular vehicle 101. Likewise, the server 125 could, as mentioned above, provide data to the computer 105 for use in determining parameters 117, e.g., map data, data concerning weather conditions, road conditions, construction zones, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide an affective user interface 119 including, or alternatively, a human machine interface (HMI) to the computer 105.

Exemplary Process Flows

Figure 2:
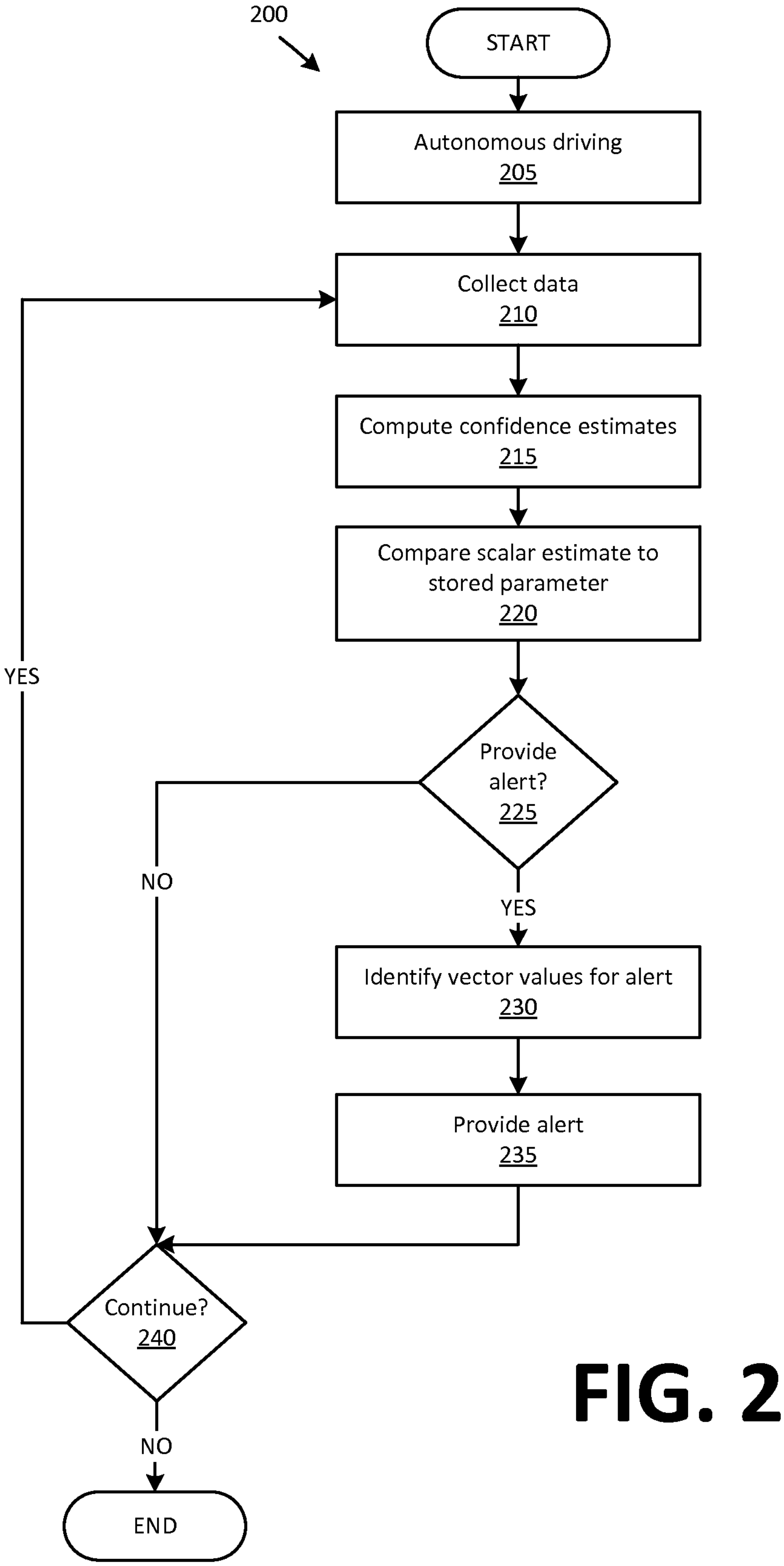
FIG. 2 is a diagram of an exemplary process for assessing, and providing alerts based on confidence levels relating to autonomous vehicle operations.

FIG. 2 is a diagram of an exemplary process 200 for assessing, and providing alerts based on confidence levels relating to autonomous vehicle 101 operations.

The process 200 begins in a block 205, in which the vehicle 101 commences autonomous driving operations. Thus, the vehicle 101 is operated partially or completely autonomously, i.e., in a manner partially or completely controlled by the autonomous driving module 106. For example, all vehicle 101 operations, e.g., steering, braking, speed, etc., could be controlled by the module 106 in the computer 105. It is also possible that the vehicle 101 may be operated in a partially autonomous (i.e., partially manual, fashion, where some operations, e.g., braking, could be manually controlled by a driver, while other operations, e.g., including steering, could be controlled by the computer) 105. Likewise, the module 106 could control when a vehicle 101 changes lanes. Further, it is possible that the process 200 could be commenced at some point after vehicle 101 driving operations begin, e.g., when manually initiated by a vehicle occupant through a user interface of the computer 105.

Next, in a block 210, the computer 105 acquires collected data 115. As mentioned above, a variety of data collectors 110, e.g., sensors or sensing subsystems in the PL, or actuators or actuators subsystems in the AL, may provide data 115 to the computer 105.

Next, in a block 215, the computer 105 computes one or more confidence assessments 118. For example, the computer 105 generally computes the overall scalar confidence assessment 118 mentioned above, i.e., a value Φ that provides an indicia of whether the vehicle 101 should continue autonomous operations, e.g., when compared to a predetermined threshold $\Phi_{min}$. The overall confidence assessment 118 may take into account a variety of factors, including various collected data 115 relating to various vehicle 101 attributes and/or attributes of a surrounding environment.

Further, the overall confidence assessment 118 may take into account a temporal aspect. For example, data 115 may indicate that an unexpected lane closure lies ahead, and may begin to affect traffic for the vehicle 101 in five minutes. Accordingly, an overall confidence assessment 118 at a given time may indicate that autonomous operations of the vehicle 101 may continue. However, the confidence assessment 118 at the given time plus three minutes may indicate that autonomous operations of the vehicle 101 should be ended. Alternatively or additionally, the overall confidence assessment 118 at the given time may indicate that autonomous operations of the vehicle 101 should cease, or that there is a possibility that autonomous operations should cease, within a period of time, e.g., three minutes, five minutes, etc.

Additionally in the block 215, one or more vector of attribute or subsystem confidence assessments 118 may also be generated. As explained above, vector confidence assessments 118 provide indicia related to collected data 115 pertaining to a particular vehicle 101 and/or vehicle 101 subsystem, environmental attribute, or condition. For example, an attribute confidence assessment 118 may indicate a degree of risk or urgency associated with an attribute or condition such as road conditions, weather conditions, braking capabilities, ability to detect a lane, ability to maintain a speed of the vehicle 101, etc.

Following the block 215, in the block 220, the computer 105 compares the overall scalar, confidence assessment 118, e.g., the value Φ, to a stored parameter 117 to determine a confidence interval, i.e., range of values, into which the present scalar confidence assessment 118 falls. For example, parameters 117 may specify, for various confidence intervals, values that may be met or exceeded within a predetermined degree of certainty, e.g., five percent, 10 percent, etc., by a scalar confidence assessment 118.

Following the block 220, in a block 225, the computer 105 determines whether the overall confidence assessment 118 met or exceeded a predetermined threshold, for example, by using the result of the comparison of the block 215, the computer 105 can determine a confidence interval to which the confidence assessment 118 may be assigned. A stored parameter 117 may indicate a threshold confidence interval, and the computer 105 may then determine whether the threshold confidence interval indicated by the parameter 117 has been met or exceeded.

As mentioned above, a threshold confidence interval may depend in part on a time parameter 117. That is, a confidence assessment 118 could indicate that a vehicle 101 should not be autonomously operated after a given period of time has elapsed, even though at the current time the vehicle 101 may be autonomously operated within a safe margin. Alternatively or additionally, a first overall confidence assessment 118, and possibly also related sub-assessments 118, could be generated for a present time and a second overall confidence assessment 118, and possibly also related sub-assessments, could be generated for a time subsequent to the present time. A message 116 including an alert of the like could be generated where the second assessment 118 met or exceeded a threshold, even if the first assessment 118 did not meet or exceed the threshold, such alert specifying that action, e.g., to cease autonomous operations of the vehicle 101, should be taken before the time pertaining to the second assessment 118. In any event, the block 225 may include determining a period of time after which the confidence assessment 118 will meet or exceed the predetermined threshold within a specified margin of error.

In any event, the object of the block 225 is to determine whether the computer 105 should provide a message 116, e.g., via the affective interface 119. As just explained, an alert may relate to a presence recommendation that autonomous operations of the vehicle 101 be ended, or may relate to a recommendation that autonomous operations of the vehicle 101 is to be ended after some period of time has elapsed, within a certain period of time, etc. If a message 116 is to be provided, then a block 230 is executed next. If not, then a block 240 is executed next.

In the block 230, the computer 105 identifies attribute or subsystem assessments 118, e.g., values in a vector of assessments 118 such as described above, that may be relevant to a message 116. For example, parameters 117 could specify threshold values, whereupon an assessment 118 meeting or exceeding a threshold value specified by a parameter 117 could be identified as relevant to an alert. Further, assessments 118, like scalar assessments 118 discussed above, could be temporal. That is, an assessment 118 could specify a period of time after which a vehicle 101 and/or environmental attribute could pose a risk to autonomous operations of the vehicle 101, or an assessment 118 could pertain to a present time. Also, an assessment 118 could specify a degree of urgency associated with an attribute, e.g., because an assessment 118 met or exceeded a threshold confidence interval pertaining to a present time or a time within a predetermined temporal distance, e.g., 30 seconds, two minutes, etc., from the present time. Additionally or alternatively, different degrees of urgency could be associated with different confidence intervals. In any event, in the block 230, attribute assessments 118 meeting or exceeding a predetermined threshold are identified for inclusion in the message 116. One example of using a grammar for an audio message 116, and modifying words in the message to achieve a desired prosody, the prosody being determined according to subsystem confidence assessments 118 in a vector of confidence assessments 118, is provided above.

Following the block 230, in a block 235, the computer 105 provides a message 116 including an alert or the like, e.g., via an HMI or the like such as could be included in an affective interface 119. Further, a value of an overall assessment 118 and/or one or more values of attribute assessments 118 could be used to determine a degree of emotional urgency provided in the message 116, e.g., as described above. Parameters 117 could specify different threshold values for different attribute assessments 118, and respective different levels of urgency associated with the different threshold values. Then, for example, if an overall assessment 118 fell into a lower confidence interval, i.e., if there were a lower likelihood that autonomous operations of the vehicle 101 should be ended, the affective interface 119 could be used to provide a message 116 with a lower degree of urgency than would be the case if the assessment 118 fell into a higher confidence interval. For example, as described above, a pitch of a word, or a number of times a word was repeated, could be determined according to a degree of urgency associated with a value of an assessment 118 in a PL or AL vector. Also as described above, the message 116 could include specific messages related to one or more attribute assessments 118, and each of the one or more attribute messages could have varying degrees of emotional urgency, e.g., indicated by prosody in an audio message, etc., based on a value of an assessment 118 for a particular attribute.

In the block 240, which could follow either the block 225 or the block 235, the computer 105 determines whether the process 200 should continue. For example, a vehicle 101 occupant could respond to an alert provided in the block 235 by ceasing autonomous operations of the vehicle 101. Further, the vehicle 101 could be powered off and/or the computer 105 could be powered off. In any case, if the process 200 is to continue, then control returns to the block 210. Otherwise, the process 200 ends following the block 240.

Figure 3:
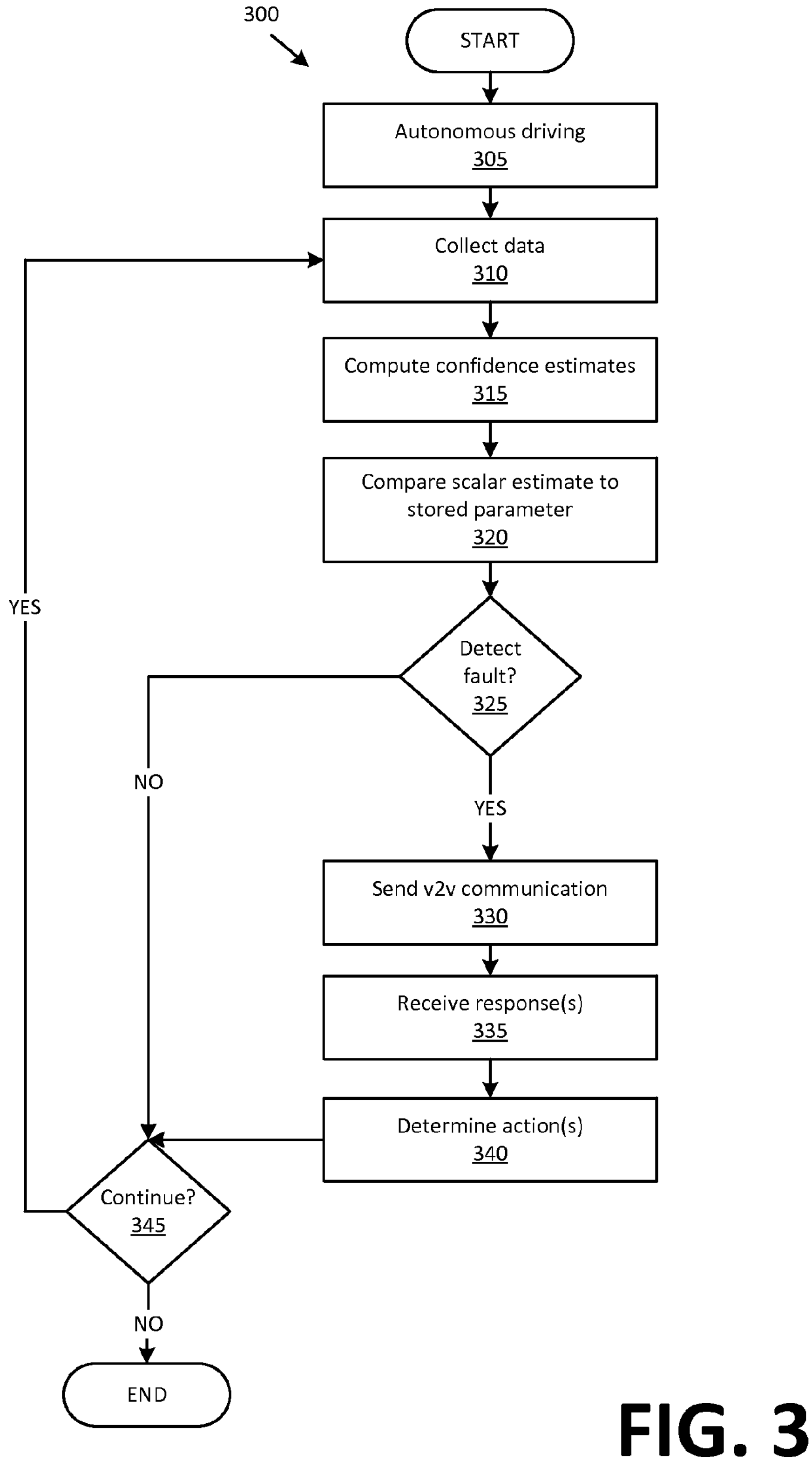
FIG. 3 is a diagram of an exemplary process for assessing, and taking action based on, confidence levels relating to autonomous vehicle operations.

FIG. 3 is a diagram of an exemplary process 300 for assessing, and taking action based on, confidence levels relating to autonomous vehicle 101 operations. The process 300 begins with blocks 305, 310, 315, 320 that are executed in a manner similar to respective blocks 205, 210, 215, and 220, discussed above with regard to the process 200.

Following the block 320, in a block 325, the computer 105 determines whether the overall confidence assessment 118 met or exceeded a predetermined threshold, e.g., in a manner discussed above concerning the block 225, whereby the computer 105 may determine whether a fault is detected for a vehicle 101 data collector 115.

In the case where a threshold confidence depends at least in part on a time parameter 117, a fault may be indicated because a confidence assessment 118 indicates that a vehicle 101 should not be autonomously operated after a given period of time has elapsed, even though at a current time the vehicle 101 may be autonomously operated within a safe margin. Likewise, a fault could be indicated where a second assessment 118 met or exceeded a threshold, even if a first assessment 118 did not meet or exceed the threshold.

In any event, the object of the block 325 is to determine whether the computer 105 in a first vehicle 101 should determine that a fault, e.g., in a data collector 110, has been detected. Further, it is possible that multiple faults could be detected at a same time in a vehicle 101. As noted above, detection of a fault may merit a recommendation that one or more autonomous operations of the vehicle 101 be ended, or may relate to a recommendation that one or more autonomous operations of the vehicle 101 is to be ended after some period of time has elapsed, within a certain period of time, etc. If a fault is detected, then a block 330 is executed next, or, in implementations that, as discussed below, omit the blocks 330 and 335, the process 300 may, upon detection of a fault in the block 325, proceed to a block 340. If not, then a block 345 is executed next.

In the block 330, the first vehicle 101 sends a v2v communication 112 that may be received by one or more second vehicles 101 within range of the first vehicle 101. The v2v communication 112 generally indicated that a fault has been detected in the first vehicle 101, and may further indicate the nature of the fault. For example, a v2v communication 112 may include a code or the like indicating a component in the first vehicle 101 that has been determined to be faulty and/or indicating a particular kind of collected data 115 that cannot be obtained and/or relied upon, e.g., in an instance where a collected datum 115 may be the result of fusing various data 115 received directly from more than one sensors data collectors 110.

Next, in a block 335, the first vehicle 101 may receive one or more v2v communications 112 from one or more second vehicle 101. V2v communications received in the first vehicle 101 from a second vehicle 101 may include collected data 115 from the second vehicle 101 for the first vehicle 101, whereby the first vehicle 101 may be able to conduct certain operations. In general, data 115 from a second vehicle 101 may be useful for two general types of fault conditions in a first vehicle 101. First, a first vehicle 101 may have lost an ability to determine a vehicle 101 location, e.g., GPS coordinates, location in a roadway due to a faulty map, etc. Second, the first vehicle 101 may have lost an ability to detect objects such as obstacles in a surrounding environment, e.g., in a roadway.

For example, the first vehicle 101 could receive data 115 from a second vehicle 101 relating to a speed and/or location of the second vehicle 101, relating to a location of obstacles such as rocks, potholes, construction barriers, guard rails, etc., as well as data 115 relating to a roadway, e.g., curves, lane markings, etc.

Following the block 335, in a block 340, the first vehicle 101 computer 105 determines an action or actions to take concerning vehicle 101 operations, whereupon such actions may be implemented by the autonomous module 106. Such determination may be made, as mentioned above, at least in part based on data 115 received from one or more second vehicles 101, as well as possibly based on a fault or faults detected in the first vehicle 101. Alternatively or additionally, as mentioned above, in some implementations of the system 100 the blocks 330 and 335 may be omitted, i.e., a first vehicle 101 in which a fault is detected may not engage in v2v communications, or may not receive data 115 from any second vehicle 101. Accordingly, and consistent with examples given above, the action determined in the block 340 could be for the vehicle 101 to cease and/or disable one or more autonomous operations based on a fault or faults detected in one or more data collectors 110.

Returning to the case in which a first vehicle 101 has received data 115 from one or more second vehicles 101, for example, a first vehicle computer 101 could include instructions for creating a virtual map, either two-dimensional or three-dimensional, of an environment, e.g., a roadway, obstacles and/or objects on the roadway (including other vehicles 101), etc. The virtual map could be created using a variety of collected data 115, e.g., camera image data, lidar data, radar data, GPS data, etc. Where data 115 in a first vehicle 101 may be faulty because a fault condition is identified with respect to one or more data collectors 110, data 115 from one or more second vehicles 101, including possibly historical data 115 discussed further below, may be used to construct the virtual map.

Alternatively or additionally, a second vehicle 101 could provide a virtual map or the like to a first vehicle 101. For example, a second vehicle 101 could be within some distance, e.g., five meters, 10 meters, 20 meters, etc. from a first vehicle 101 on a roadway. The second vehicle 101 could further detect a difference in speed, if any, between the second vehicle 101 in the first vehicle 101, as well as a position of the first vehicle 101 relative to the second vehicle 101, e.g., a distance ahead or behind on the roadway. The second vehicle 101 could then provide virtual map data 115 to the first vehicle 101, such data 115 being translated to provide accordance for a position of the first vehicle 101 as opposed to a position of the second vehicle 101. Accordingly, the first vehicle 101 could obtain information about other vehicles 101, obstacles, lane markings, etc. on a roadway even when data 115 collected in the first vehicle 101 may be faulty.

In any case, data 115 from a second vehicle 101 could, to provide a few examples, indicate a presence of an obstacle in a roadway, a location of lines or other markings or objects in a roadway indicating lane boundaries, a location of the second vehicle 101 or some other vehicle 101, etc., whereupon the first vehicle 101 could use the data 115 from the second vehicle 101 for navigation. For instance, data 115 about a location of a second vehicle 101 could be used by a first vehicle 101 to avoid the second vehicle 101; data 115 in a communication 112 about objects or obstacles in a roadway, lane markings, etc. could be likewise used. Note that the data 115 from a second vehicle 101 could include historical or past data, e.g., data 115 showing a location or sensed data, such as of the second vehicle 101 over time.

Further for example, the computer 105 in the first vehicle 101 could determine, based on an indicated fault, an action such as pulling to a road shoulder and slowing to a stop, continuing to a highway exit before stopping, continuing navigation based on available data 115, possibly but not necessarily including collected data 115 from the first vehicle 101 as well as one or more second vehicles 101, etc. Note that the data 115 from a second vehicle 101 could be used to determine an action, e.g., to determine a safe stopping location. For example, a camera data collector 110 in a first vehicle 101 may be faulty, whereupon images from a camera data collector 110 in a second vehicle 101 could provide data 115 in a communication 112 by which the first vehicle 101 could determine a safe path to, and stopping point in, a roadway. Alternatively, a vehicle 101, e.g., where blocks 330 and 335 are omitted, could determine an action, e.g., a safe stopping location, based on available data 115 collected in the vehicle 101. For example, if a camera data collector 110 or the like used for determining road lane boundaries became subject to a fault, the vehicle 101 could continue to a road shoulder based on stored map data, GPS data 115, and/or extrapolation from last known reliably determined lane boundaries.

In addition, it is possible that v2v communications 112 between a first vehicle 101 and a second vehicle 101 could be used for the second vehicle 101 to lead the first vehicle. For example, path information and/or a recommended speed, etc., could be provided by a lead second vehicle 101 ahead of a first vehicle 101. The second vehicle 101 could lead the first vehicle 101 to a safe stopping point, e.g., to a side of a road, or could lead the first vehicle 101 to a location requested by the first vehicle 101. That is, the second vehicle 101, in one or more v2v communications 112, could provide instructions to the first vehicle 101, e.g., to proceed at a certain speed, heading, etc., until the first vehicle 101 had been brought to a safe stop. This cooperation between vehicles 101 may be referred to as the second vehicle 101 "tractoring" the first vehicle 101.

In general, the nature of a fault may indicate an action directed by the computer 105. For example, a fault in a redundant sensor data collector 110, e.g., a camera where multiple cameras are mounted on a front of a vehicle, may indicate that the vehicle 101 may continue operating using available data 115. On the other hand, a fault in a vehicle 101 speed controller and/or other element(s) responsible for vehicle 101 control, may indicate that the vehicle 101 should proceed to a road shoulder as quickly as possible.

Following the block 340, in a block 345, the computer 105 determines whether the process 300 should continue. For example, the vehicle 101 could be powered off and/or the computer 105 could be powered off. In any case, if the process 300 is to continue, then control returns to the block 310. Otherwise, the process 300 ends following the block 345.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a first vehicle, the computer comprising a processor and a memory, wherein the computer includes instructions to:
- collect data during operation of the first vehicle;
- determine that a confidence assessment of at least one of the data indicates at least one fault condition in at least one data-providing component in the first vehicle;
- transmit a communication to at least one second vehicle indicating the at least one fault condition; and
- receive at least one datum from a second vehicle;
- determine an autonomous operation of the first vehicle based at least in part on the at least one datum.

2. The system of claim 1, wherein the autonomous operation is one of maintaining a lane in a roadway, maintaining a speed, pulling to a side of a roadway, and bringing the first vehicle to a stop.

3. The system of claim 1, wherein the communication includes data sent according to Dedicated Short Range Communications (DSRC).

4. The system of claim 1, wherein the communication is made using visual light emitted by the first vehicle.

5. The system of claim 1, wherein the computer further includes instructions to use the at least one datum to determine a location of an obstacle.

6. The system of claim 1, wherein the at least one datum includes at least one of a location of the second vehicle, a location of an object on a roadway, a location of a lean on a roadway, a location of a third vehicle, and an instruction for operating the first vehicle.

7. The system of claim 1, wherein the at least one fault condition is related to at least one of a sensor in a first vehicle and a reliability of a data value determined in the first vehicle.

8. A system, comprising a computer in a vehicle, the computer comprising a processor and a memory, wherein the computer includes instructions to:
- collect data during operation of the first vehicle;
- determine that a confidence assessment of at least one of the data indicates at least one fault condition in at least one data-providing component in the first vehicle; and
- discontinue a first autonomous operation affected by the fault condition;
- continue a second autonomous operation that is unaffected by the fault condition.

9. The system of claim 8, wherein at least one of the first autonomous operation and the second autonomous operation is one of maintaining a lane in a roadway, maintaining a speed, pulling to a side of a roadway, and bringing the first vehicle to a stop.

10. The system of claim 8, wherein the computer further includes instructions to use the at least one datum to determine a location of an obstacle.

11. The system of claim 8, wherein the at least one datum includes at least one of a location of the second vehicle, a location of an object on a roadway, a location of a lean on a roadway, a location of a third vehicle, and an instruction for operating the first vehicle.

12. The system of claim 8, wherein the at least one fault condition is related to at least one of a sensor in a first vehicle and a reliability of a data value determined in the first vehicle.

13. A method, comprising:

collecting, in a first vehicle computer, data during operation of the first vehicle;

determining in the first vehicle computer that a confidence assessment of at least one of the data indicates at least one fault condition;

causing, by the first vehicle computer, transmission of a communication to at least one second vehicle indicating the at least one fault condition in at least one data-providing component in the first vehicle; and receiving in the first vehicle computer at least one datum from the at least one second vehicle;

determining an autonomous operation of the first vehicle based at least in part on the at least one datum.

14. The method of claim 13, wherein the autonomous operation is one of maintaining a lane in a roadway, maintaining a speed, pulling to a side of a roadway, and bringing the first vehicle to a stop.

15. The method of claim 13, wherein the communication includes data sent according to Dedicated Short Range Communications (DSRC).

16. The method of claim 13, wherein the communication is made using visual light emitted by the first vehicle.

17. The method of claim 13, further comprising using the at least one datum to determine a location of an obstacle.

18. The method of claim 13, wherein the at least one datum includes at least one of a location of the second vehicle, a location of an object on a roadway, a location of a lean on a roadway, a location of a third vehicle, and an instruction for operating the first vehicle.

19. The method of claim 13, wherein the at least one fault condition is related to at least one of a sensor in a first vehicle and a reliability of a data value determined in the first vehicle.

20. The method of claim 8, wherein the confidence assessment includes determining a confidence interval in a set of confidence intervals into which a confidence value falls.

* * * * *